United States Patent
Emmert

(10) Patent No.: US 6,318,058 B1
(45) Date of Patent: Nov. 20, 2001

(54) FEEDER HOUSE

(75) Inventor: Walter Emmert, Contwig (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/490,373

(22) Filed: Jan. 24, 2000

(30) Foreign Application Priority Data

Apr. 14, 1999 (DE) .............................................. 199 16 645

(51) Int. Cl.⁷ .................................................. A01D 41/14
(52) U.S. Cl. .............................................................. 56/14.6
(58) Field of Search .................................. 56/14.5, 14.3, 56/14.6, 16.5, 365, 471, 301, 303, 14.9, 15.6–15.9, 16.1, 16.2; 460/11, 12, 13, 68, 69, 70, 80, 101

(56) References Cited

U.S. PATENT DOCUMENTS

| 3,731,470 | 5/1973 | Cornish et al. . |
| 4,253,295 | 3/1981 | Knepper . |
| 4,266,395 | 5/1981 | Basham . |
| 5,497,605 | * 3/1996 | Underwood et al. ................. 56/14.6 |
| 6,116,008 | * 9/2000 | Digman et al. ........................ 56/15.8 |

FOREIGN PATENT DOCUMENTS

| 2302449 | 8/1973 | (DE) . |
| 43 24 766 A1 | 1/1995 | (DE) . |
| 295 19 842U1 | 3/1996 | (DE) . |
| 0 448 844 A1 | 10/1991 | (EP) . |
| 0 685 147 A1 | 5/1995 | (EP) . |
| 0 862 849 A1 | 9/1998 | (EP) . |
| 15 44 557 | 11/1967 | (FR) . |
| 21 69 785 A | 7/1986 | (GB) . |

* cited by examiner

Primary Examiner—Robert E. Pezzuto

(57) ABSTRACT

The invention concerns a feeder house (38) with a first conveyor (66) for the transport of harvested crop, a second conveyor arranged downstream of the first conveyor and a mounting arrangement (54) for the mounting of a header (74) to the feeder house. In order to attain an optimum transition of the harvested crop from the header (74) to the first conveyor (66), the mounting arrangement (54) is supported in bearings, free to pivot, relative to the feeder house (38) about an axis that is generally coaxial with the axis (64) of the first conveyor (66).

12 Claims, 3 Drawing Sheets

FEEDER HOUSE

BACKGROUND OF THE INVENTION

1. Field of the Invention

The invention concerns a feeder house of a harvesting machine and in particular to a feeder house with a front face for the attachment of a front harvesting header wherein the front face is pivotable about a horizontal axis transverse to the direction of operation to adjust the header for changing contours of the ground.

2. Description of the Related Art

A feeder house for a harvesting machine, such as a combine, is known in which a vertical pivoting adjustment is integrated into the feeder house or the supply channel, in order to be able to pivot a header about a horizontal axis that extends transverse to the direction of operation of the harvesting machine. This enables adjustment to be made due to changing contours of the ground.

EP 685 147 A discloses a feeder house manufactured in two parts and having a pivot axis between the two halves of the housing along the bottom side of the slope conveyor. The disadvantage here is that the attainable pivot angle is relatively small, and that crop can intrude into the gap between the two housing halves.

DE 43 24 766 A discloses a feeder house with a front face at the front of the feeder house which pivots about a horizontal axis that is transverse to the direction of forward operation. The pivot axis is arranged at the bottom of the slope conveyor.

DE 23 02 499 A discloses a feeder house in which a front face is movable in a generally vertical direction by corresponding hydraulic cylinders but is not pivoted about a transverse axis. In this feeder house, as well as in that described in DE 43 24 766 A, the disadvantage is seen in the fact that the transition of the harvested crop from the header, in particular from the auger in the header, to the slope conveyor, is not always optimal, since the spacing between the auger and the slope conveyor changes as a function of the pivot angle or the height of the front face.

A feeder house is shown in EP 448 844 A and U.S. Pat. No. 4,253,295 in which the front face can be pivoted about an axis that is arranged approximately coaxial with the axis of a front roller of a chain conveyor. Here too, an optimal transition of the harvested crop is not possible from the header to the chain conveyor, since the chain conveyor must be spaced sufficiently far from the auger of the header in order to make possible a sufficiently large pivot angle.

U.S. Pat. No. 4,266,395 discloses an add-on adapter assembly at the front of a feeder house to enable pivoting of a header about a fore and aft axis. The adapter assembly includes a first component that couples to the feeder house in the same manner as the header. A second component is mounted to the first component to pivot about a fore and aft axis. The header is then mounted to the second component of the adapter assembly. A rotary feeder is carried by the second component to assist in conveying crop material from the header into the feeder house.

SUMMARY OF THE INVENTION

The present invention seeks to provide a feeder house that can adjust the header angle and maintain an optimum transfer of the harvested crop from the header to the slope conveyor of the feeder house. This is accomplished by providing a first conveyor and a second conveyor downstream of the first conveyor, with respect to the flow of the harvested crop, and by configuring the front mounting face to which the header is fastened so as to pivot about an axis that is approximately coaxial with the axis of the first conveyor. The first conveyor is arranged at an optimum spacing from the header so that the best possible transfer of the harvested crop from the header to the first conveyor can be achieved. Since the pivot axis of the front mounting face is aligned (at least approximately) with the axis of the first conveyor, the spacing between the header and the first conveyor remains constant at all times and optimum conveying of the harvested crop is guaranteed at all pivot angles of the header. The mounting arrangement can include a front face that makes possible a lateral pivoting motion of the header about the longitudinal axis of the harvesting machine in order to accommodate for uneven ground laterally. But a rigid attachment of the header to the mounting arrangement is also conceivable.

In the state of the art, as well as, in particular, from the EP 448 844 A, it has become known that the conveyor and the mounting arrangement are supported in bearings, each movable in two directions separately in a relatively costly manner. To reduce the expense and the cost of manufacture, it is proposed that the mounting arrangement be rotatably supported in bearings directly or indirectly on the axis of the first conveyor. Thereby the axes of the first conveyor and of the mounting arrangement are always coaxial.

In actual terms, it is conceivable to rigidly attach the axis of the first conveyor to the housing of the feeder house in such a way that it projects through a corresponding opening in the housing in order to support the mounting arrangement in bearings on a section of the axis that extends beyond the housing of the feeder house. As an alternative, the mounting arrangement can be supported in bearings on a section of the axis of the first conveyor positioned on the interior of the housing, in particular on the wall of the housing. It should be noted that the axis of the first conveyor, as a rule, is a driven shaft. In this case the designation "axis" is understood to mean the longitudinal axis of the shaft.

The axis of the first conveyor is preferably fastened rigidly to the housing, that is, not movable or able to be shifted, but may also be adjustable in a manner known in itself in the vertical and/or horizontal direction (with respect to the forward operating direction). Regardless of that fact, the first conveyor is free to rotate about its axis.

The second conveyor may be a chain conveyor, that includes a first and a second roller, of which at least one is driven, and about which a conveyor chain with corresponding lugs for the harvested crop circulates.

The first conveyor in particular is most likely to be a roller that conveys the harvested crop as an undershot conveyor or an overshot conveyor. The advantage of a roller lies in its shorter length in comparison to a chain conveyor, which permits a greater pivot angle, without the mounting arrangement making contact with the first conveyor. In addition, it is possible to position the first conveyor closer to the header which makes possible an improved transition of the harvested crop from the header to the feeder house.

In an advantageous embodiment of the invention, a roller with paddles is used as the first conveyor. It conveys the harvested crop effectively and rapidly from the header to the second conveyor which conducts it to the harvesting machine.

Furthermore, additional support is provided for the mounting arrangement at the housing of the feeder house so that the pivot axis does not have to carry the entire load of the header and the mounting arrangement. This support can be provided primarily by pins that slide in corresponding slots. The pins may be attached to the mounting arrangement with the slots in the housing of the feeder house, or inversely, the pins may be fastened to the housing and the slots formed in the mounting arrangement.

The movement through the pivot angle of the mounting arrangement can be performed by one or more hydraulic cylinders or electric motors or in a simple and low cost mechanical manner. For a mechanical adjustment, a pin is proposed one end of which is connected to the mounting arrangement and the other end is provided with a nut that is mechanically carried by the housing of the feeder house. The pivot angle can be changed by turning the nut. Only one such pin may be provided on one side of the housing of the feeder house, or two pins can be applied to either side of the feeder house. The latter solution remains safe in operation in case of breakage of one pin, but a greater effort is required for an adjustment. It should be noted that the pin can be fastened to the housing of the feeder house, while the nut then is mechanically carried by the mounting arrangement.

In a manner known in itself, the feeder house may be provided with a one-piece housing. However, the housing may be a two-piece design, where the first conveyor is preferably arranged in the second part of the housing; here the second part may be a separate module. The mounting arrangement is then also attached to the module.

The invention can be applied to all types of headers, for example, with front mower attachments, that are particularly suitable for harvesting grain crops, forage harvesters and corn heads.

Finally it should be noted that the invention can also be attained in the form of a separate module added to a conventional feeder house. This module is attached to a feeder house and the header rigidly attached thereto. The module contains a first conveyor and a mounting arrangement to which a header can be fastened. As a rule, the feeder house contains a second conveyor that conveys the harvested crop transported by the first conveyor into a harvesting machine for further processing. Since the axis of the first conveyor and the pivot axis of the mounting arrangement are at least approximately coaxial, here, too, an optimum transition of the harvested material from the header into the feeder house is always guaranteed.

DESCRIPTION OF THE PREFERRED EMBODIMENT

Figure 1:
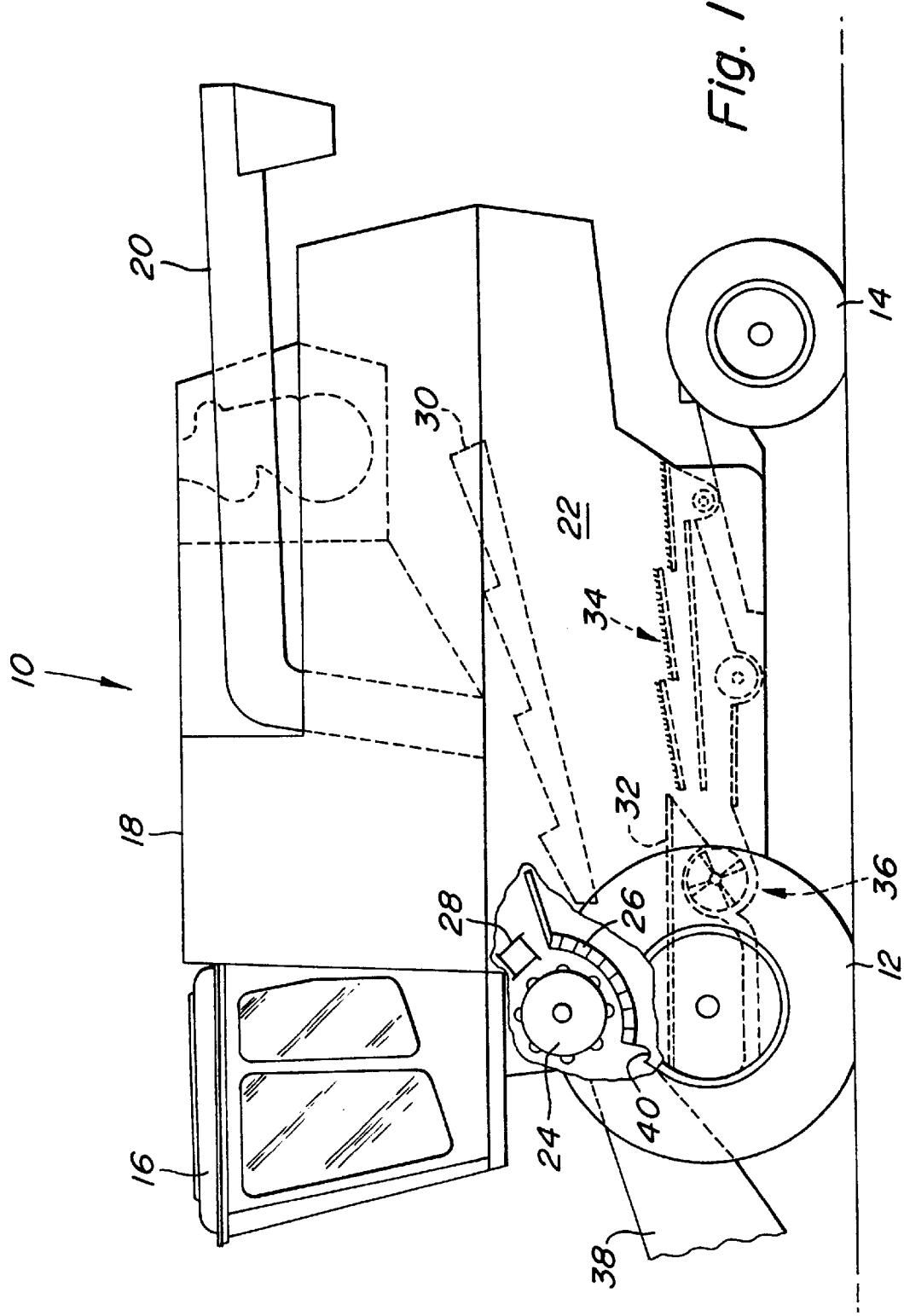
FIG. 1 is a side view of a harvesting machine for use with a feeder house according to the present invention.

A harvesting machine 10, in the form of a combine, is shown in FIG. 1 and includes front driven and rear steerable wheels 12, 14 and an operator's cab 16 from which the harvesting machine can be controlled by an operator. Tracks can be used in place of the wheels if desired. To the rear of the operator's cab 16 there is a grain tank 18 that can deliver crop deposited in it to the outside through an unloading auger 20. The grain tank 18 is supported on a frame 22 in which crop supplied thereto is threshed in its path between a cylinder 24 and concave 26 and past a beater 28. On straw walkers 30 as well as on a pan 32 and sieves 34, further separation of the grain from the harvested crop is performed where finally the grain is conveyed into the grain tank 18, the large components of the crop material are deposited on the ground over the straw walkers 30 and chaff is blown by means of a fan 36 from the sieves 34, also onto the ground.

After being taken up from the ground by a header, not shown in FIG. 1, crop is conducted through a feeder house 38, having a slope conveyor and a stone catcher trough 40, to the cylinder 24. The feeder house 38 is attached to the front side of the harvesting machine 10 and is free to pivot about a horizontal axis extending transverse to the plane of the drawing. It can be pivoted by corresponding hydraulic cylinders, not shown in the drawing, as is well known. Alternatively, a feeder house 38 that is rigidly attached to the combine, and is not pivoted, is also possible.

Figure 2:
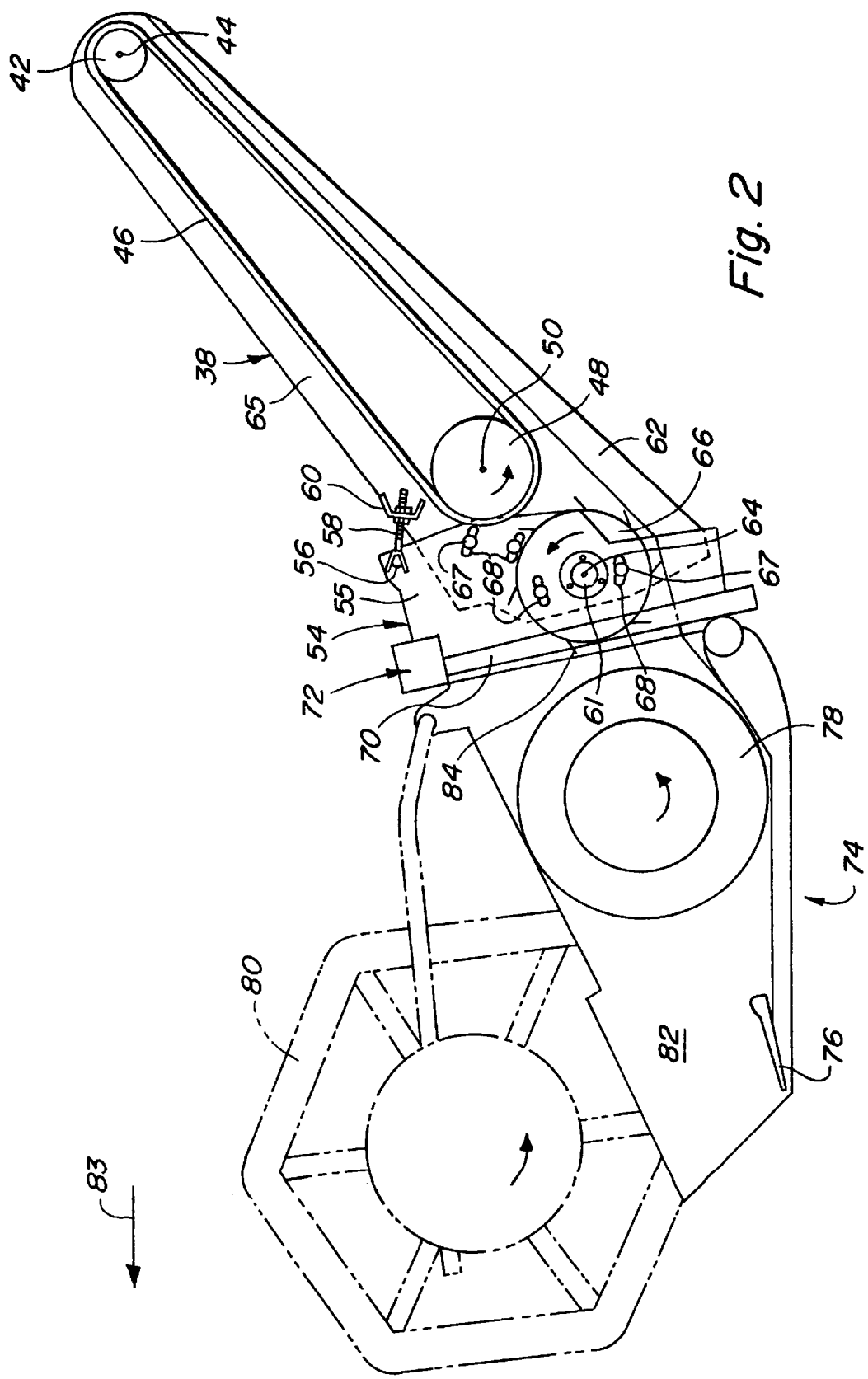
FIG. 2 is a side view of a first embodiment of a feeder house according to the present invention.

FIG. 2 shows the feeder house 38 according to a first embodiment of the invention. A header 74 is fastened to the front of the feeder house. The feeder house 38 is provided with a housing 62. The housing 62 contains a slope conveyor having an upper conveyor roller 42, that rotates about an axis 44, a lower conveyor roll 48, that rotates about an axis 50, as well as a conveyor chain 46 circulating about both the upper and lower rolls 42, 48. The chain conveyor has impeller lugs, not shown, for conveying the harvested crop. One of the conveyor rolls 42, 48 is driven so as to rotate counterclockwise, as seen in FIG. 2, so the harvested crop is conveyed upward between the conveyor chain 46 and a bottom of the housing 62 into the harvesting machine 10. The upper and lower rolls 42, 48 and the chain conveyor form a second conveyor 52. A first conveyor 66 is positioned before the lower conveyor roller 42 and is in the form of a transport roller with paddles 84 attached to its circumference. The first conveyor 66 is also driven to rotate counterclockwise about an axis 64 as seen in FIG. 2. Hence the harvested crop is conveyed by an undershot conveyor. The paddles 84 are slightly inclined against the direction of rotation, in order to be able to convey the harvested crop optimally.

At the front of the feeder house 38, as seen in the direction of operation identified by the arrow 83, a mounting arrangement 54 is positioned. The mounting arrangement 54 is open on its front side facing the header 74. As a rule this opening is rectangular and the harvested crop passes through it. In addition, the mounting arrangement 54 is provided with side walls 55 that are in contact with the outer surfaces of the forward portions of the side walls 65 of the housing 62 of the feeder house 38. The side walls 65 of the housing 62 do not extend to the front side of the mounting arrangement 54 but end short of that, in order to make possible a pivoting of the mounting arrangement 54 with the header 74. At its side walls, the mounting arrangement 54 is rotatably supported in bearings about the shaft 61 of the first conveyor 66 which defines a conveyor axis 64. In addition, pins 67 are attached to both side walls 65 of the housing 62 of the feeder house 38, and extend through circular-arc shaped slots 68 in the side walls 55 of the mounting arrangement 54. The pins 67 support the mounting arrangement 54 against the force of gravity, and the slots 68 limit the range of pivot angles. The pivot angle of the mounting arrangement 54 is defined mechanically by a threaded pin 58 which is attached, free to rotate, at a first end 56 to the mounting arrangement 54. The pin 58 extends through a support 60 that is provided with a corresponding opening and is welded to the housing 62 of the feeder house 38. The pin 58 is fastened to the support 60 by nuts that are in contact with both sides of the support 60, this fixes the pivot angle. By an adjustment of the nuts, a desired pivot angle of the mounting arrangement 54 can be established.

A front face 70, known in the art, is provided on the front side of the mounting arrangement 54, which permits a lateral pivoting motion of the header 74 about the longitudinal axis of the harvesting machine 10. The header 74 is provided with a support beam 72 that extends transverse to the direction of forward operation and supports the header 74 on the mounting arrangement 54.

The header 74 is shown as a platform, which is well known, having a cutter bar 76 in the form of an reciprocating mower, located between two side walls 82, which severs crop from stubble remaining on the ground. A reel 80 is arranged above and in front of the cutter bar 76, in order to press the crop against the cutter bar 76 and toward an auger 78. The auger 78 transports the harvested crop to the center of the header 74, where it is taken by the first conveyor 66 and is directed into the housing 62 of the feeder house 38. The housing 62, as a rule, is narrower than the header 74.

Figure 3:
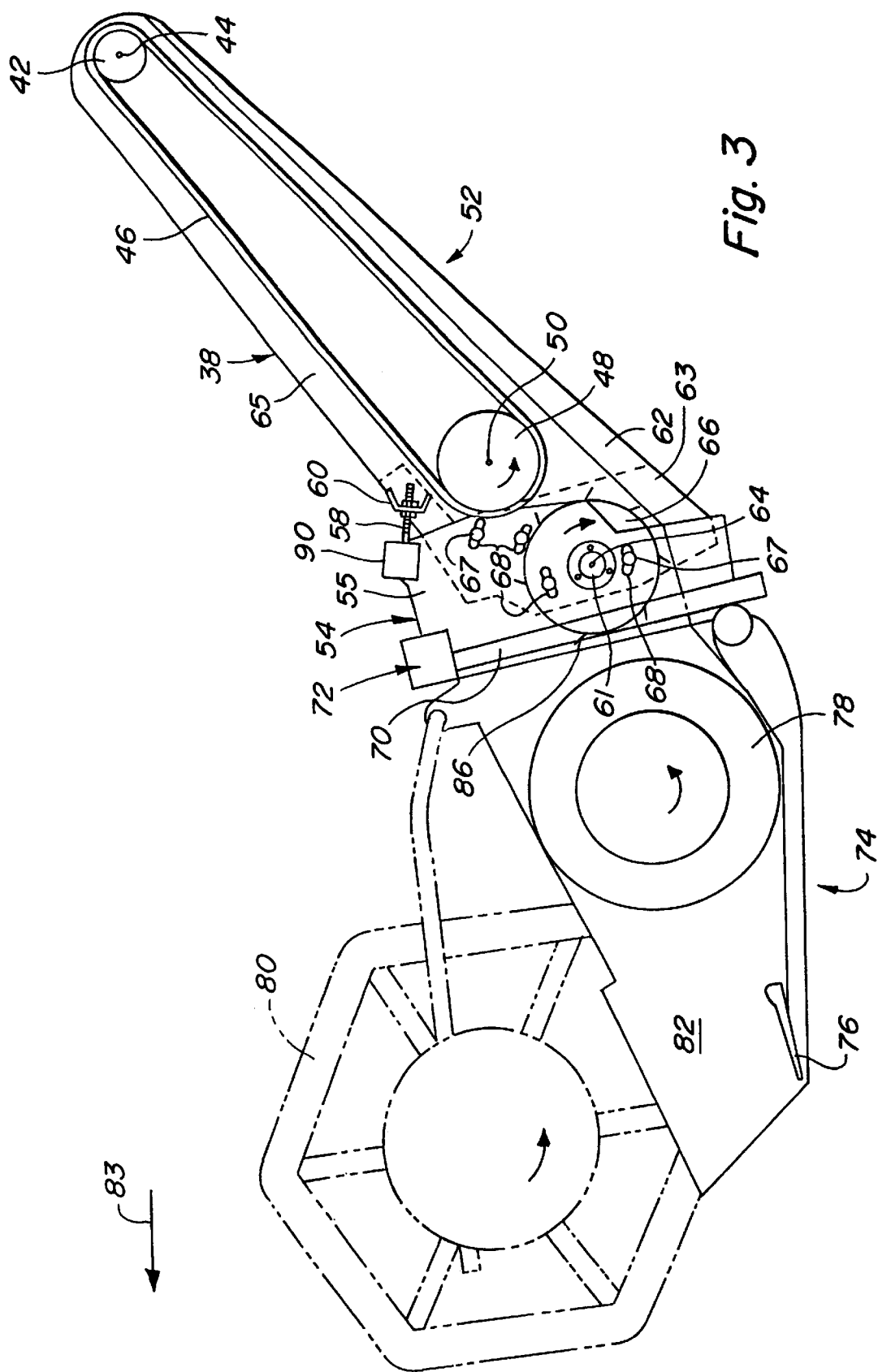
FIG. 3 is a side view of a second embodiment of a feeder house according to the present invention.

FIG. 3 shows the first conveyor 66, a transport roll, operating as an overshot conveyor driven in a clockwise direction. It is equipped with paddles 86, which are slightly inclined toward the direction of rotation. Furthermore the feeder house of FIG. 3 is provided with two parts: the housing 62 and a separate module 63, which is fastened to the front of the housing 62, for example, attached by a flange. The housing 62 contains, in known manner, the sloped conveyor with the conveyor chain 46 as the second conveyor 52. The first conveyor 66 is supported in bearings in the module 63, and the mounting arrangement 54 is also supported in bearings, free to pivot, on the module 63. The pivot axis of the mounting arrangement 54 is coaxial with the axis 64 of the first conveyor 66. The module 63 is configured in the same way as the front region of the one-piece feeder house of FIG. 2. The module 63 is primarily beneficial as an add on device to a conventional feeder house that only has the sloped conveyor 52 to provide the benefit of the first and second conveyors of the present invention.

In the embodiment of FIG. 3, the pivot angle of the mounting arrangement 54 is controlled by a remote actuator 90 which may be a servo motor, hydraulic cylinder, etc. The actuator 90 is coupled to the mounting arrangement 54 and a threaded pin 58 extends therefrom to the module 63. The threaded pin is mounted to the module as described above in connection with FIG. 2. Alternatively, the actuator can be coupled to the module 63 and the pin 58 extend to the mounting arrangement 54. The remote actuator 90 allows the pivot angle of the mounting arrangement to be changed remotely, such as from the operator's cab 16. The remote actuator 90 is an alternative to the device shown in FIG. 2 and can be used with that embodiment of the invention as well.

As a result of the fact that the pivot axis of the mounting arrangement 54 is coaxial with the axis 64 of the first conveyor 66, the harvested crop is transported optimally from the header into the harvesting machine 10 at any desired pivot angle of the mounting arrangement 54.

The invention should not be limited to the above-described embodiment, but should be limited solely by the claims that follow.

I claim:

1. A feederhouse (38) for a harvesting machine comprising a housing (62), a first conveyor (66) for the transport of harvested crop mounted to the housing (62) and having a horizontal shaft (61) defining a conveyor axis (64), which extends transverse to the direction of conveying, a second conveyor mounted to the housing (62) and arranged downstream of the first conveyor (66), and a mounting arrangement (54) for attachment of a header (74) to the feederhouse (38), the mounting arrangement (54) being free to pivot on the housing (62) about an axis extending coaxially to the axis (64) of the first conveyor (66).

2. The feeder house (38) as defined by claim 1 wherein the mounting arrangement (54) is supported on bearings on the shaft (61).

3. The feeder house (38) as defined by claim 1 wherein the housing (62) is a two-piece housing including a module (63) that contains the first conveyor (66) and upon which the mounting arrangement (54) is supported in bearings, free to pivot.

4. The feeder house (38) as defined by claim 1 wherein the second conveyor includes a conveyor chain (46) which circulates about a first roller (42) and a second roller (48), of which at least one can be driven.

5. The feeder house (38) as defined by claim 1 wherein the first conveyor (66) is a roller driven in rotation that performs overshot conveying.

6. The feeder house (38) as defined by claim 1 wherein the first conveyor (66) is a roller driven in rotation that performs undershot conveying.

7. The feeder house (38) as defined by claim 1 wherein the first conveyor (66) is a roller with paddles (84, 86).

8. The feeder house (38) as defined by claim 1 wherein the mounting arrangement (54) is supported by pins that are guided in slots (68) in a housing (62) of the feeder house (38).

9. The feeder house (38) as defined by claim 8 wherein the slots (68) are arranged in the mounting arrangement (54) and the pins are connected to a housing (62) of the feeder house (38).

10. The feeder house (38) as defined by claim 1 wherein the pivot angle of the mounting arrangement (54) is fixed by a threaded pin (58) that is connected at one end to the mounting arrangement (54) or the housing (62) of the feeder house (38) and at the other end through a nut to the housing (62) or the mounting arrangement (54).

11. The feeder house (38) as defined by claim 1 wherein the pivot angle of the mounting arrangement (54) is fixed by a remote actuator (90) connected to the mounting arrangement (54) or the housing (62) of the feeder house (38) and a pin (58) that extends from the remote actuator (90) and is connected to the other of the housing (62) or the mounting arrangement (54).

12. A module (63) for the attachment between a feederhouse (38) containing a conveyor and a header (74), the module (63) comprising a first conveyor (66) and a mounting arrangement (54) for the fastening of the header (74), where the mounting arrangement (54) is supported in bearings, free to pivot about an axis that is coaxial with the axis (64) of the first conveyor (66).

\* \* \* \* \*